United States Patent
Virgile

(10) Patent No.: US 7,813,759 B2
(45) Date of Patent: Oct. 12, 2010

(54) METHOD AND SYSTEM FOR INLINING SERVICES WITHIN A NETWORK ACCESS DEVICE

(75) Inventor: Kenneth E. Virgile, Lexington, MA (US)

(73) Assignee: Starent Networks LLC, Wilmington, DE (US)

( * ) Notice: Subject to any disclaimer, the term of this patent is extended or adjusted under 35 U.S.C. 154(b) by 540 days.

(21) Appl. No.: 11/649,328

(22) Filed: Jan. 3, 2007

(65) Prior Publication Data

US 2007/0223437 A1   Sep. 27, 2007

Related U.S. Application Data

(60) Provisional application No. 60/755,981, filed on Jan. 4, 2006.

(51) Int. Cl.
   *H04M 1/00* (2006.01)
(52) U.S. Cl. .................. 455/552.1; 455/466; 709/206; 709/233
(58) Field of Classification Search ......... 370/259–271; 455/414.1–414.4, 415, 418, 426.2, 432.3, 455/466, 456.3
   See application file for complete search history.

(56) References Cited

U.S. PATENT DOCUMENTS

| | | | |
|---|---|---|---|
| 6,138,156 A * | 10/2000 | Fletcher et al. | 709/224 |
| 6,431,875 B1 * | 8/2002 | Elliott et al. | 434/322 |
| 6,477,590 B1 | 11/2002 | Habusha et al. | |
| 6,687,252 B1 | 2/2004 | Bertrand et al. | |
| 6,714,987 B1 | 3/2004 | Amin et al. | |
| 6,741,853 B1 | 5/2004 | Jiang et al. | |
| 6,775,273 B1 | 8/2004 | Kung et al. | |
| 6,778,494 B1 | 8/2004 | Mauger | |
| 6,853,630 B1 | 2/2005 | Manning | |
| 6,854,014 B1 | 2/2005 | Amin et al. | |

(Continued)

FOREIGN PATENT DOCUMENTS

WO   WO-01/22642 A2   3/2001

OTHER PUBLICATIONS

Partial International Search Report issued for International Patent Application No. PCT/US2007/000132.

(Continued)

*Primary Examiner*—Kent Chang
*Assistant Examiner*—Shahriar Behnamian
(74) *Attorney, Agent, or Firm*—Wilmer Cutler Pickering Hale and Dorr LLP

(57) ABSTRACT

An apparatus for providing network access and application session services includes a wireless network access device for receiving packet data streams from or transmitting packet data streams to one or more subscribers, and for conveying the packet data streams to or from a network or other subscribers. The wireless network access device includes profile information relating to the one or more subscribers. The apparatus further includes one or more application session services that are provided as a component of the wireless network access device. The wireless network access device selects, based on the profile information, zero or more of the application session services to process the packet data streams. The wireless network access device can also determine an application state associated with the packet data streams, and can modify actions of at least one of the application session services according to the application state.

36 Claims, 7 Drawing Sheets

U.S. PATENT DOCUMENTS

| | | |
|---|---|---|
| 6,910,074 B1 | 6/2005 | Amin et al. |
| 6,973,309 B1 | 12/2005 | Rygula et al. |
| 7,269,727 B1 | 9/2007 | Mukherjee et al. |
| 7,324,551 B1 | 1/2008 | Stammers |
| 7,454,206 B1 | 11/2008 | Phillips et al. |
| 7,529,711 B2 | 5/2009 | Reith |
| 7,587,512 B2 * | 9/2009 | Ta et al. ...................... 709/233 |
| 2002/0029260 A1 * | 3/2002 | Dobbins et al. ............. 709/219 |
| 2002/0131404 A1 | 9/2002 | Mehta et al. |
| 2004/0111476 A1 * | 6/2004 | Trossen et al. .............. 709/206 |
| 2007/0022199 A1 | 1/2007 | Tatsubori |
| 2007/0206515 A1 | 9/2007 | Andreasen et al. |
| 2009/0054037 A1 | 2/2009 | Kaippallimalil |

OTHER PUBLICATIONS

International Search Report and Written Opinion issued for International Patent Application No. PCT/US2007/000132.

International Search Report for International Application No. PCT/US08/83911 mailed Jan. 12, 2009 (1 page).

* cited by examiner

| Destination Server | Application Type | Application Statistics<br>Packets received/Packets sent<br>KB received/KB sent | |
|---|---|---|---|
| ftp.operator.com | FTP | 205/200 | Packets |
|  |  | 12020/50 | KB |
|  | Telnet | 1550/1552 | Packets |
|  |  | 450/45 | KB |
| mail.operator.com | HTTP | 225/225 | Packets |
|  |  | 1400/120 | KB |
|  | SMTP | 255/265 | Packets |
|  |  | 15/1 | KB |
| news.operator.com | HTTP | 1505/1505 | Packets |
|  |  | 1560/15 | KB |

FIG. 7

METHOD AND SYSTEM FOR INLINING SERVICES WITHIN A NETWORK ACCESS DEVICE

CROSS REFERENCE TO RELATED APPLICATIONS

This application claims benefit of U.S. Provisional Patent Application Ser. No. 60/755,981, filed Jan. 4, 2006, which is incorporated herein by reference in its entirety.

BACKGROUND OF THE INVENTION

The present invention relates to wireless communication services, and more particularly, to techniques for providing network application services to subscribers of a wireless communications network.

FIG. 1 shows an example of a prior art system for providing network access to one or more wireless subscribers. In order to simplify this description, the figure excludes some of the components necessary to implement the network access. However, FIG. 1 includes the major components necessary for understanding the present method and system.

Each wireless subscriber 10 communicates with a wireless network access device (WNAD) through a central antenna 12. In general, multiple antennae can be used in such systems, but for this simple example only one antenna is shown. The central antenna 12 conveys (through various other components not shown) the data packet streams from the subscribers 10 to a wireless network access device (WNAD) 14. The WNAD 14 transmits the packet data streams to a number of server groups 18, 22, 26 through associated load balancers 16, 20, 24, although the load balancers are optional and the packet data streams may go directly to the server groups. Each server group includes one or more servers, and provides application session services to the system for processing the packet data streams. After passing through the load balancers and servers, the packet data streams are relayed to a core network 28 (for example, the Internet).

The inline wireless access device 106 also communicates with an AAA server or AAA servers. In general, an AAA server handles subscriber requests for access to computer resources and, for an enterprise or the carrier, provides authentication, authorization, and accounting (AAA) services.

Each server group provides a different application session service. For example, the first server may provide a content charging service, which accounts for and assigns a particular charge to each of the services the subscriber uses. The second server group may provide an optimization service, which performs compression and other data optimization functions. The third service group may provide control services, such as parental controls and malicious code detection. These are just application session services, and many other service applications may be included in the serial path from the WNAD 14 to the network 28. Other services include, but are not limited to, packet manipulations (e.g., stateful inspections, header compression, content-aware charging, content filtering), security (e.g., stateful firewall, intrusion detection, intrusion prevention, virus checking), payload manipulation (e.g., application compression), and VPN services (e.g., IPSec, L2TP LAC/LNS, Mobile IP).

There are several disadvantages to using the architecture shown in FIG. 1. For example, since the service application servers are distinct components separate from the WNAD, the WNAD has limited control over those servers. Further, the serial nature of the path through the service application servers requires that each subscriber data packet stream pass through all of the service application servers, in the order they are connected, prior to being sent to the network. The inability to control the sequence of service delivery, or to exclude one or more of the services, makes it difficult for service providers to offer customized, tiered service packages to the subscriber. In some cases, the fixed sequence order of the services makes it difficult or impossible to provide certain services. For example, actions of an optimization service (e.g., compression) may make it difficult for a parental control service to evaluate the data stream for prohibited content.

The serially connected servers also introduce more points of failure and vulnerability to security breaches. Further, the latency that results from having traffic travel across the network is perceptible to subscribers as performance problems in latency-sensitive services, including annoying gaps or delays in conversations. Each unnecessary transit through an application server typically adds tens of milliseconds of unwanted propagation delay.

Since typical service application servers lack subscriber awareness (i.e., they do not have access to subscriber profiles), they do not permit mobile operators to offer tailored service bundles, and limit them to offering a "one size fits all" service.

SUMMARY OF THE INVENTION

The embodiments of an inline wireless network access device described herein integrate one or more application session services with a wireless network access device. The inline wireless network access device can apply one or more, or none of the application session services to a particular packet data stream from a wireless subscriber, as appropriate depending upon the subscriber profile. Further, the inline wireless network access device can apply the application session services to the packet data stream in any order.

The inline wireless network access device applies the application session services in a serial fashion so that they can be executed in a sequential manner during normal data packet processing. The application of this sequential processing is referred to herein as "inline services."

There are several advantages to integrating the application session services with the wireless network access devices. For example, the servers that provide the application session services in the prior art typically do not incorporate a significant amount of redundancy. However, the architecture of the wireless network access device typically incorporates redundancy to a high degree. By integrating the application session services into the wireless network access device architecture, those services can benefit from the inherent redundancy.

When the application session services are provided via servers outside and independent of the wireless network access device, the service provider typically cannot select some services and exclude others, since the path through the servers is fixed by the physical system architecture. Although the service provider may be able to develop a protocol for communicating with the servers to allow such selection and exclusion, such development adds significant cost to the system. Also, since changes to the servers are often outside of the control of the service provider, the service provider will have to modify the protocol whenever such changes occur. Having the application session services integrated with and under the control of the wireless network access device allows for convenient selection and exclusion of those services.

Further, by having the application session services all in the same location and under control of the wireless network access device (i.e., service awareness), the effects of each service can be ascertained and used in relation to the other services. The wireless network access device can arrange the order in which the services are executed to increase the effectiveness of the various services. In some cases, there are benefits to executing the services in a particular order. For example, services (such as parental control) that need to examine the content of a data packet stream to operate may be negatively impacted if the packet data stream is affected by a service (such as optimization) that manipulates the data stream in some way.

Since subscriber profiles are available to the wireless network access device (i.e., subscriber awareness), those profiles can be easily evaluated to determine which services are to be used for a particular subscriber, and also which services can be excluded.

As described above, the embodiments of the inline wireless network access device described herein have both subscriber awareness and service awareness. This dual awareness allows the inline wireless network access device to identify the individual subscriber down to the session level, and make decisions about what services should be provided in a particular session.

When the application session services are provided via servers outside and independent of the wireless network access device, load balancing devices are typically needed to distribute the session data streams to the servers, leading to additional cost and potential failure points.

Also, external servers tend to be dedicated to their particular applications, while the internal resources of a wireless network access device may be dynamically allocated to whatever functionality is necessary. So the integrated solution provides greater flexibility for expansion of services or modification of how many sessions use which applications.

In one aspect of the invention, an apparatus for providing network access and application session services includes a wireless network access device for receiving packet data streams from or transmitting packet data streams to one or more subscribers, and for conveying the packet data streams to or from a network or other subscribers. The wireless network access device includes profile information relating to the one or more subscribers. The apparatus also includes one or more application session services. These application session services are a component of the wireless network access device. The wireless network access device selects, based on the profile information, zero or more of the application session services to process the packet data streams. In other words, the wireless network access device selects one, all, none, or a combination of the application session services, based on the profile information.

In one embodiment, the wireless network access device determines a preferred order for executing the selected application session services, and arranges the selected application session services to execute in the preferred order. In one embodiment, the preferred order is configured or determined according to how each of the application session services affects other application session services.

In another embodiment, for each of the subscribers, the wireless network access device determines, based on the subscriber profile information, which application session services should not be executed for packet data streams to or from the subscriber. The wireless network access device also excludes from execution those of the one or more application session services that should not be executed for packet data streams to or from the subscriber, based on the profile.

In another embodiment, at least one of the application session services includes a charging service that examines content of the packet data stream, determines an amount to be charged for the content, and maintains a record of the amounts charged.

In yet another embodiment, the wireless network access device and the application session services are implemented with redundancy.

In another aspect, a method of providing network access and application data session services includes receiving packet data streams from or transmitting packet data streams to one or more subscribers with a wireless network access device, and conveying the packet data streams to or from a network or other subscribers. The wireless network access device includes profile information relating to the one or more subscribers. The method also includes providing one or more application session services as a component of the wireless network access device, and selecting, based on the profile information, zero or more of the application session services to process the packet data streams.

Another embodiment further includes determining a preferred order for executing the selected application session services, and arranging the selected application session services to execute in the preferred order.

Another embodiment further includes for each of the subscribers, determining which application session services should not be executed for packet data streams to or from the subscriber. The determining is based on the subscriber profile information. The method further includes excluding from execution those of the one or more application session services that should not be executed for packet data streams to or from the subscriber, based on the profile information.

Another embodiment further includes examining content of the packet data stream, determining an amount to be charged for the content, and maintaining a record of the amounts charged.

In another aspect, an apparatus for providing network access and application session services includes a wireless network access device for receiving packet data streams from or transmitting packet data streams to one or more subscribers, and for conveying the packet data streams to or from a network or other subscribers. The apparatus also includes one or more application session services being a component of the wireless network access device. The one or more application session services processes the packet data streams. The wireless network access device selects zero or more of the application session services to process the packet data streams. The wireless network access device determines an application state associated with the packet data streams, and modifies actions of at least one of the application session services according to the application state.

In one embodiment, the wireless network access device performs deep packet inspection to determine the application state associated with the packet data streams.

In another embodiment, the wireless network access device modifies actions associated with an application session service concerned with billing functions when another application session service modifies or drops packets from the packet data stream.

In another aspect, a method of providing network access and application session services includes receiving packet data streams from or transmitting packet data streams to one or more subscribers with a network access device, and conveying the packet data streams to or from a network or other subscribers. The application session services are a component of the wireless network access device. The method further includes providing one or more application session services as a component of the wireless network access device. The one or more application session services processes the packet data streams. The method also includes selecting zero or more of the application session services to process the packet data streams, determining an application state associated with the packet data streams, and modifying actions of at least one of the application session services according to the application state.

In another aspect, an apparatus for providing network access and application session services includes a wireless network access device for receiving packet data streams from or transmitting packet data streams to each of one or more subscribers, and for conveying the packet data sessions to or from a network or other subscribers. The wireless network access device includes profile information relating to each of the one or more subscribers. The apparatus also includes one or more application session services being a component of the wireless network access device. For each of the subscribers, the wireless network access device selects, based on the profile information for the subscriber, zero or more of the application session services to process the packet data sessions for the subscriber.

BRIEF DESCRIPTION OF DRAWINGS

The foregoing and other objects of this invention, the various features thereof, as well as the invention itself, may be more fully understood from the following description, when read together with the accompanying drawings in which:

FIG. 7 shows, for the described embodiment, an example of the type of information that can be collected and presented to the carriers for application-based billing.

DESCRIPTION OF THE PREFERRED EMBODIMENTS

The embodiments of an inline wireless network access device described herein integrate one or more application session services with a wireless network access device (WNAD). The functionality of the wireless network access device may be that of any one of a number such devices known in the art. For example, in one embodiment the WNAD includes the functionality of a PDSN (Packet Data Serving Node). In other embodiments, the WNAD may include the functionality of a GGSN (Gateway GPRS Service Node), an ASN (Access Service Network) Gateway, or a wireless network access device used for WiFi solutions.

In the described embodiments, the inline wireless network access device can apply one or more, or none of the application session services to a particular packet data stream from a subscriber, as appropriate depending upon the subscriber profile. Further, the inline wireless network access device can apply the application session services to the packet data stream in any order.

The inline wireless network access device applies the application session services in a serial fashion so that they can be executed in a sequential manner during normal data packet processing. The application of this sequential processing is referred to herein as "inline services."

Figure 1:
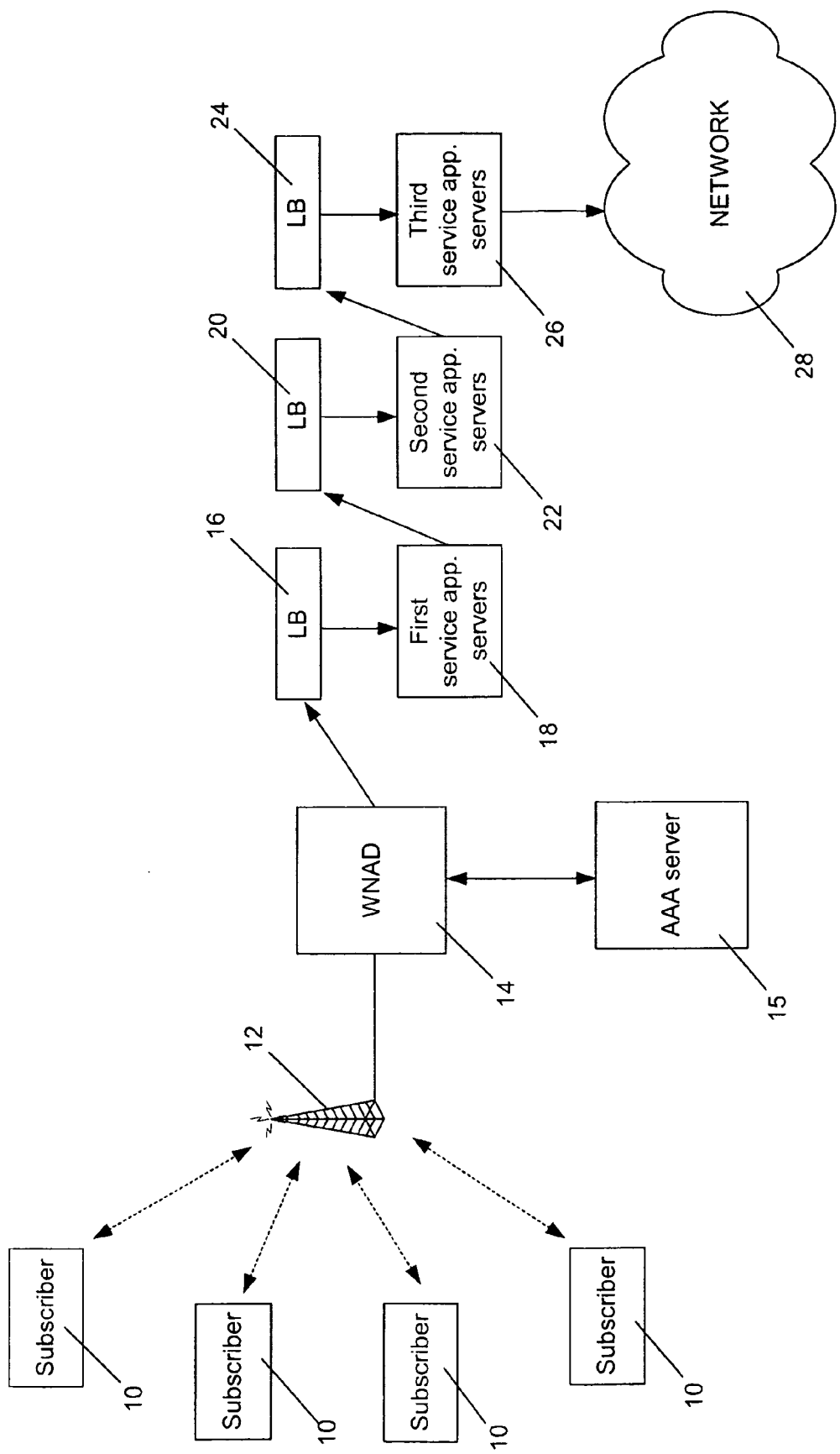
FIG. 1 shows an example of a prior art system for providing network access to one or more wireless subscribers.
Figure 2:
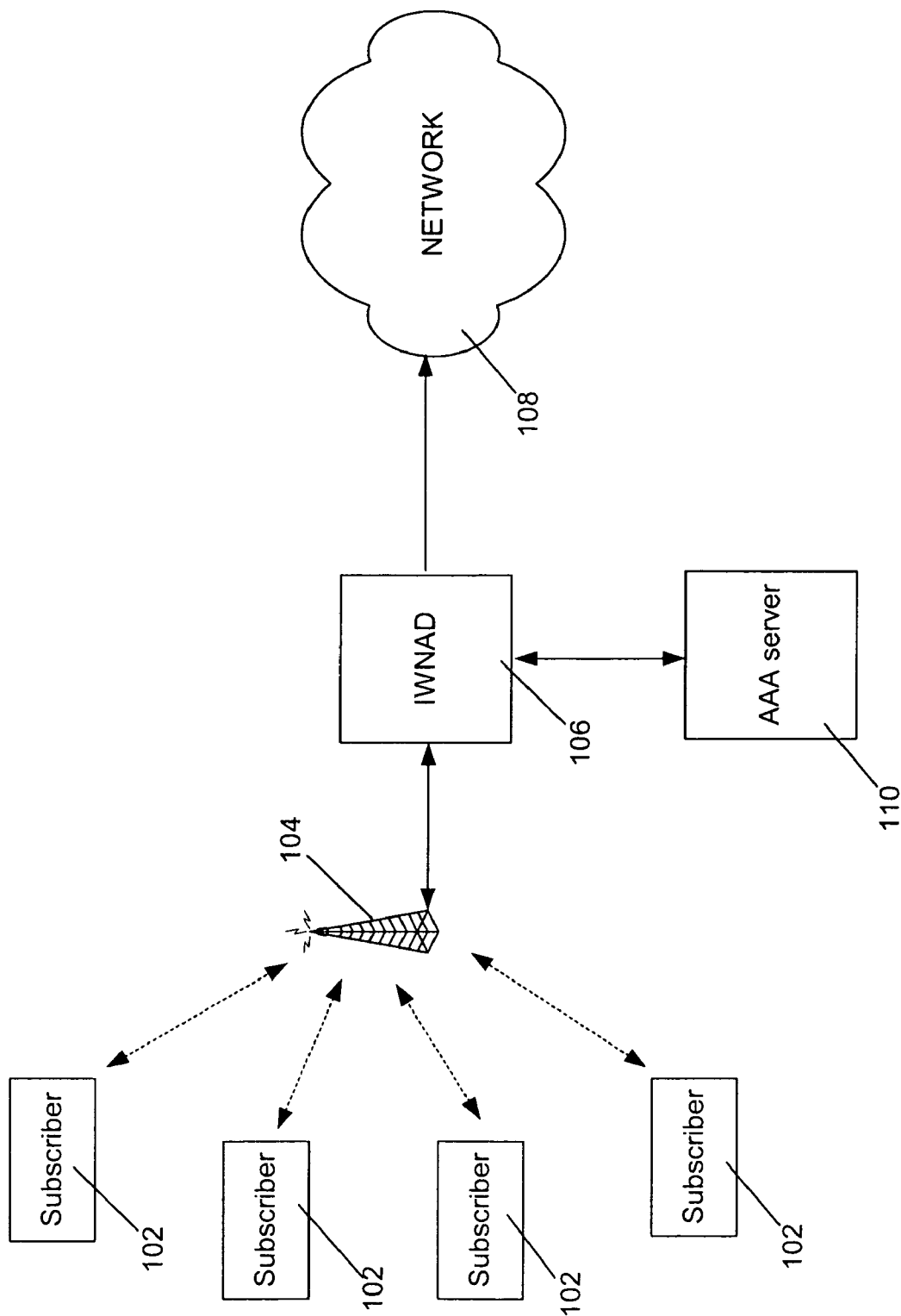
FIG. 2 shows one embodiment of the inline wireless network access device in a system for providing network access to one or more wireless subscribers, according to the invention.

FIG. 2 shows one embodiment of the inline wireless network access device in a system for providing network access to one or more wireless subscribers, according to the invention. Each wireless subscriber 102 communicates with the inline wireless network access device 106 through a central antenna 104. The inline wireless network access device 106 processes the packet data streams and sends packet data streams to a core network 108 (for example, the Internet). The packet data streams also flow in the reverse direction, i.e., from core network 108 to the wireless subscriber 102, and the packet data streams may also go between wireless subscribers using the inline wireless network access device. The inline wireless access device 106 also communicates with an AAA server or AAA servers. In general, an AAA server handles subscriber requests for access to computer resources and, for an enterprise or the carrier, provides authentication, authorization, and accounting (AAA) services. The AAA server typically interacts with network access and gateway servers and with databases and directories containing subscriber information, which are commonly called subscriber profiles. One current standard by which devices or applications communicate with an AAA server is the Remote Authentication Dial-In User Service (RADIUS). Although the AAA server is shown as a single device in FIG. 2, it is well known that the AAA functionality may be implemented in two or more server devices.

One or more embodiments implement the described functionality by using a processing platform to execute code. This code may be stored on any number of memory media known in the art, for example disk drives or FLASH memory, among others. Details of one embodiment of the processing platform are described herein, but other processing platforms known in the art may alternatively be used.

Figure 3:
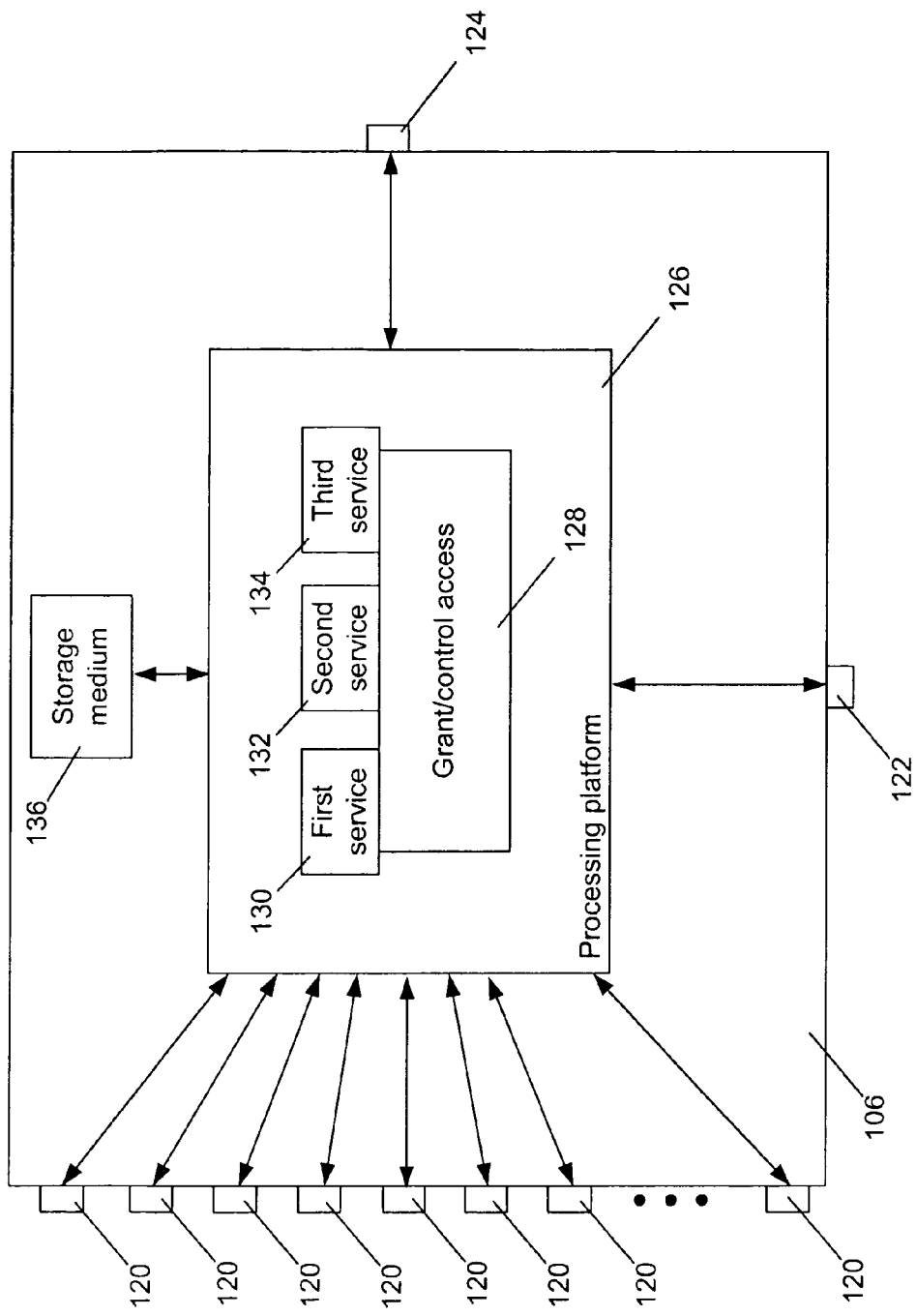
FIG. 3 conceptually illustrates one embodiment of the inline wireless network access device as shown in FIG. 2.

FIG. 3 conceptually illustrates one embodiment of the inline wireless network access device 106. The device 106 includes multiple subscriber ports 120 for communicating with the subscribers 102, an AAA port 122 for communicating with the AAA server 110, and a network port 124 for communicating with the core network 108. These ports are for illustration only, and it should be understood that they do not necessarily represent the physical ports. For example, in one embodiment the subscriber ports 102 may be physically implemented with a single port, with the subscriber data streams being conveyed via multiple logical connections through that single port. Similarly, the single AAA port shown in FIG. 3 may be implemented with multiple physical ports.

FIG. 3 also shows the processing platform 126 logically connected to the subscriber ports 120, the AAA port 122 and the network port 124. The processing platform executes code to implement a grant/control access function 128, along with the application session services 130, 132 and 134. One or more processing platforms may be present in the wireless network access device. Storage medium 136 stores the code to be executed by the processing platform 126. As with the ports, although the storage medium 136 is shown as a single entity for illustration purposes, in some embodiments the storage medium 136 includes several different types of memory media such as, but not limited to, RAM, FLASH memory, disk based memory, among others. Further, the storage medium may contain information other than the code for the processing platform to execute, such as, for example, parameters related to communication with the AAA server.

Figure 4:
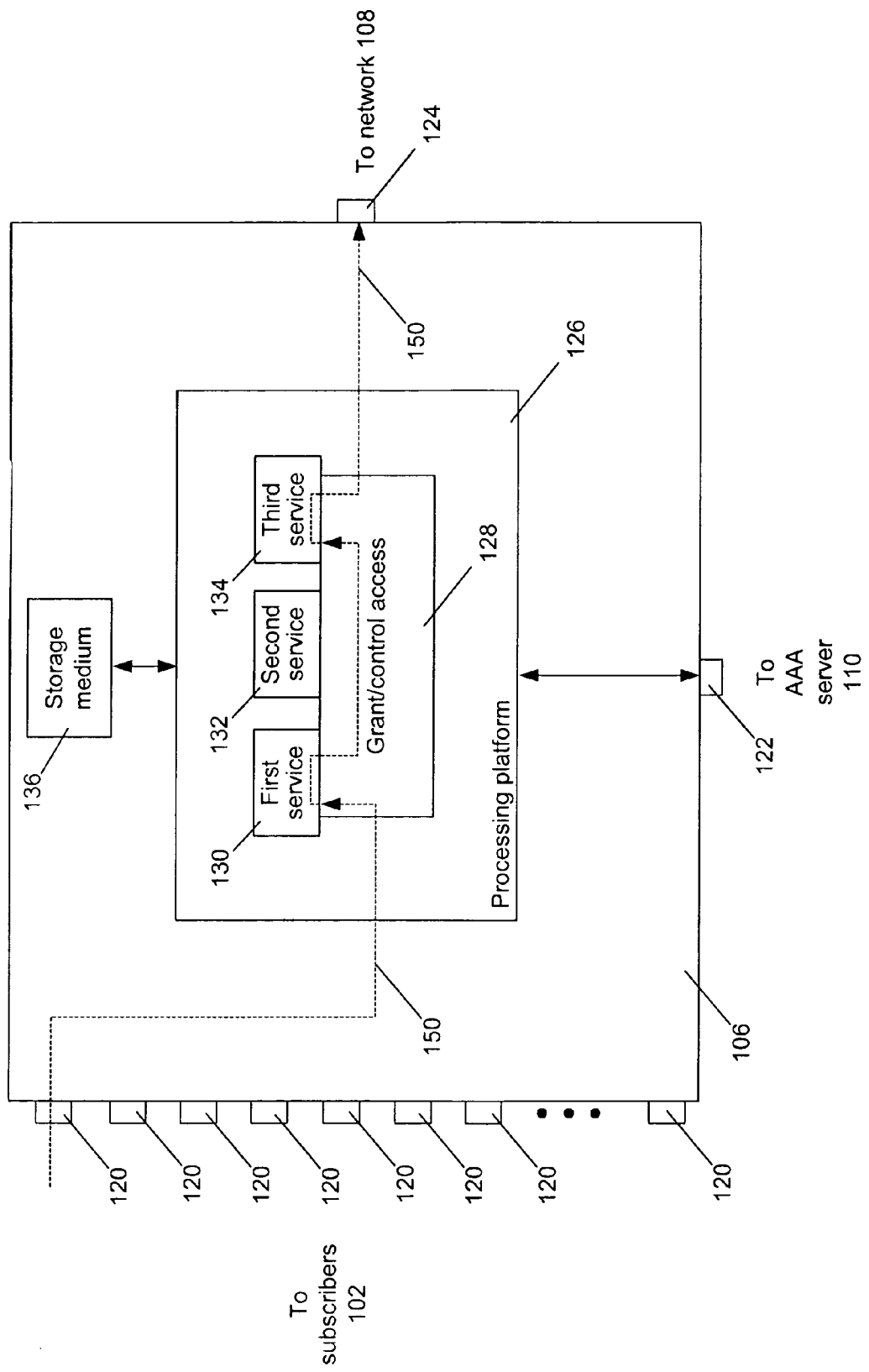
FIG. 4 illustrates one example of how the device processes data from a subscriber.

FIG. 4 illustrates one example of how the device 106 processes data from a subscriber 102. In this example, the device 106 determines from the subscriber profile that the packet data 150 from the subscriber 102 requires the first service 130 and the third service 134, but not the second service 132.

Figure 5:
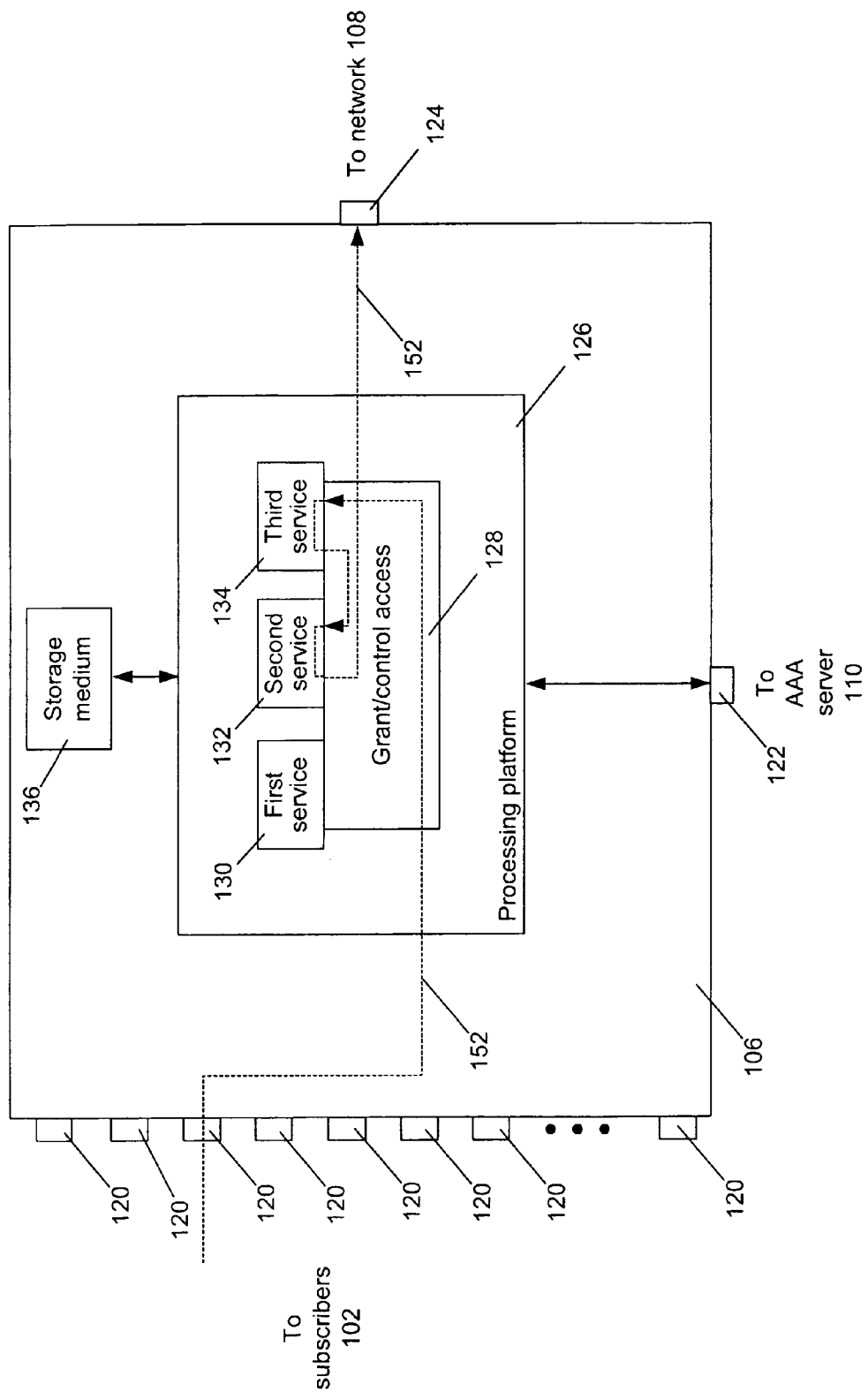
FIG. 5 illustrates another example of the device processing data from a subscriber.

FIG. 5 illustrates another example of the device 106 processing data from a subscriber 102. In this example, the device determines from the subscriber profile that the packet data 152 from the subscriber 102 requires the second service 132 and the third service 134, but not the first service. The device 106 also determines from the subscriber profile that it should apply the third service 134 prior to applying the second service 132. This example demonstrates that application of the services is not limited to any particular order.

Monitoring Application State

The functionality provided by the application session services requires monitoring the state of each application associated with the packet data streams. Knowledge of the application state is typically not present in prior art wireless network access devices. The fact that this knowledge is available within the inline wireless network access device is an important aspect of the described embodiments. The application state with respect to a particular service often affects the actions of other services.

For example, suppose a subscriber profile requires packet optimization of the subscriber's packet data stream for a particular application. And suppose the subscriber profile also requires parental controls. Charging for packet optimization in cases where the parental control service has dropped the optimized packets may not be desirable. With the described embodiments, having the subscriber profiles and the application state information available to the inline wireless network access device allows the device to selectively control the charges for the packet optimization as a function of the actions of the parental control service.

Thus in general, by having access to the subscriber profiles, and by monitoring the state of the session applications, the described embodiments can control the actions of one application session service as a function of the actions of other application session services.

Some of the described embodiments utilize deep packet inspection (DPI) to determine the state associated with a data packet stream. In general, DPI is a form of data packet filtering that examines the data portion (as opposed to just the header portion) of a through-passing packet. DPI devices have the ability to examine layer 2 through layer 7 of the OSI network model, which includes headers and data protocol structures.

Physical Architecture

The Packet Accelerator Card (PAC) 200 performs packet-processing operations in the described embodiment. Other functions, such as MAC framing, are the responsibility of other components of the inline wireless network access device, so the entire capacity (less a small amount for overhead) of the PAC 200 is available for packet processing. In this embodiment, the Packet Accelerator Card (or Cards) performs both the wireless network access functionality and the application services. However, other embodiments may use more than one card (or component) to perform both of these functions.

Figure 6:
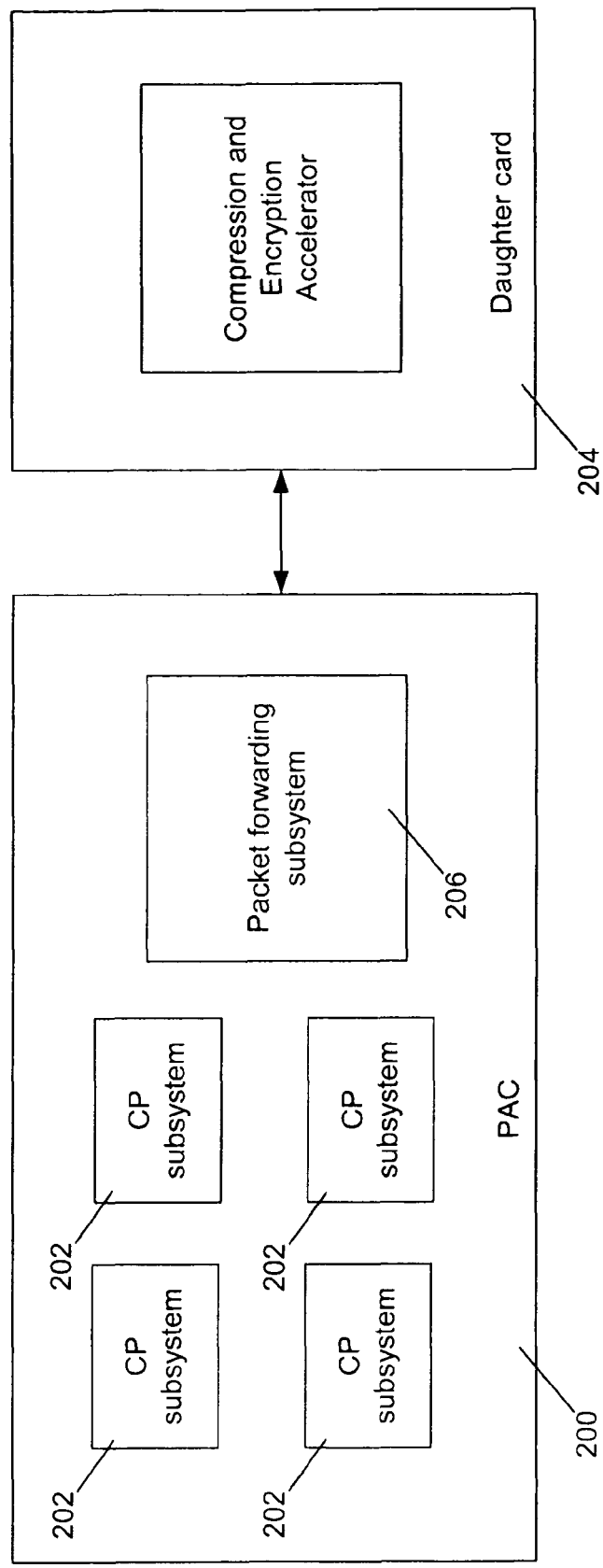
FIG. 6 shows one embodiment of a Packet Accelerator Card (PAC) from the device.

As shown in FIG. 6, each PAC 200 has four control processor (CP) subsystems 202 where the bulk of the packet-based subscriber service processing is done. In one embodiment, each CP subsystem 202 has a high-speed CPU and one gigabyte (GB) of local memory. A chassis may have multiple PACs dedicated to packet processing tasks.

In the described embodiment, each CP subsystem supports up to 1,000 subscribers. In an exemplary embodiment that supports a capacity of 20,000 subscribers, subscriber traffic is distributed among 20 CP subsystems 202 (20 CP subsystems would occupy five PACs). Each CP subsystem 202 allocates memory per subscriber, and includes memory per CP subsystem 202 for packet buffering to support caching or other inline data services. Each CP subsystem 202 includes a CPU for packet processing that is capable of supporting simultaneous traffic for multiple subscribers.

Each PAC 200 connects to a daughter card 204, to be used as a hardware assist for functionality that is to be performed by specialized hardware (as opposed to the general-purpose CPU of the CP subsystem 202), such as compression/decompression and encryption/decryption functions.

Each PAC 200 has one Packet Forwarding subsystem 206 to perform packet forwarding. It consists of a specialized hardware (e.g., ASICs and FPGAs) designed for packet forwarding operations.

In the described embodiment, the Packet Forwarding subsystem 206 forwards about 100,000 packets per second. In the exemplary embodiment with 5 PACs, the Packet Forwarding subsystems would forward about 500,000 packets per second.

In the described embodiment, multiple PACs 200 may be used in a single chassis, so packet-processing capacity can be added as needed. For the user data plane, the chassis includes high-speed data buses to inter-connect the PACs 200. There are two high-speed data buses so that there is redundancy of the data plane.

Internally, the described embodiment physically isolates the control plane from the data plane. Each card in the chassis has a separate data bus that interconnects all of the cards for control traffic.

The architecture of the described embodiment provides numerous advantages over CPU-based server hardware. Packet forwarding resources exist on a per card basis, rather than per system. Packet forwarding resources are customized for that function, rather than CPU-based servers misusing their standard CPUs that were designed for computational tasks. The control functions of the described embodiment are separated from the data processing functions, whereas a CPU-based server would be too overloaded to effectively execute the packet forwarding functionality required in wireless data services.

The described embodiment of the inline wireless network access device provides both memory and processing power on the PACs 200, plus memory and processing power on the main control cards (not shown). This gives operators the ability to host numerous value-added service applications within the system itself, eliminating the need to perform this processing externally.

Operating System and OSS Capabilities

In the described embodiment, each CPU runs a multi-threaded operating system (OS) called StarOS. StarOS is a standards-based OS that has been enhanced to provide many advantages, including fault isolation and recovery (e.g., hardware memory protection is enabled across threads). Using a standards-based OS also makes the porting of third-party software (e.g., utilities and applications) relatively easy to do.

Embedded management software within the described embodiment interfaces with simple network management protocol (SNMP), Command Line Interface (CLI) and higher level service and business management applications through Common Object Request Broker Architecture (CORBA). The described embodiment uses RADIUS to obtain subscriber profile information.

Application Session Service Example

I) Caching

The caching service in the described embodiment performs a smoothing function for audio and video streams, thereby delivering streams to the subscriber without the jitter caused by the core network (e.g., the Internet). In conjunction with Differentiated Services (DiffServ) being performed by intermediate nodes, this provides end-to-end quality of service (QoS) for the subscriber. The following is an overview of the functionality performed by the described embodiment for the caching service.

Perform initial packet processing for data received from the Internet, determining the destination mobile subscriber and forwarding the traffic to the assigned CP subsystem that is currently servicing that subscriber.

Detect that data received from the Internet is part of a flow that would benefit from caching. With existing protocols supported by the described embodiment, that would simply be any packet that is RTP over UDP/IP. It is possible to change the appropriateness decision to be a configurable option. For example, such a mechanism could specify a smoothing treatment for RTP over UDP/IP, or for certain values in the DiffServ ToS octet. It would also be possible to use the Multi-Channel Flow Treatment Protocol (MCFTP) to dynamically define the flow detection parameters.

Examine the subscriber profile that was returned via RADIUS when the subscriber's session was established to ascertain that the caching service has been purchased.

Convert the Internet data into radio network packets. For example, the Internet data may have been received as RTP/UDP/IP/Ethernet, whereas, the radio network packets may have to be RTP/UDP/IP/PPP encapsulated within GRE/IP/Ethernet to the PCF (Packet Control Function device) when the wireless access device is acting as a PDSN.

Buffer the outgoing data (in a per-subscriber queue) until a certain amount is received. Typically, five to ten seconds worth of data is initially buffered.

Start sending to the subscriber at a constant rate. Some embodiments use feedback from the radio network to adjust the data rate.

The following architectural aspects of the described embodiment support the processing described above.

Abundance of memory for buffering packets.

Abundance of CPU processing power for maintaining per-flow traffic shaping.

Specialized packet forwarding hardware for much faster packet processing.

One configuration of the described embodiment is as follows.

Use DiffServ for QoS. Packets with audio/visual data are given precedence over other types of packets. Per-subscriber filters are used to specify new DiffServ type of service (ToS) values for the packets sent to the PCF. This would simplify the processing by the PCFs, since the PCFs would be able to determine the desired QoS by examining just the ToS octet.

Use a limited automatic repeat request (ARQ). Link ARQ can operate on individual frames, using implicit transparent link fragmentation. Link frames may be much smaller than IP packets, and repetition of smaller frames containing lost or erred parts of an IP packet may improve the efficiency of the ARQ process and the efficiency of the link. However, if the ARQ process is configured to be extremely robust (e.g., perform many retries), it can introduce unacceptable amounts of latency and jitter.

Use a large maximum transmission unit (MTU). The aforementioned technique of DifServ for QoS reduces the audio/video packet latency and jitter. The limited ARQ reduces the error rate, so the MTU size is not an important factor for the subscriber's audio/visual experience. Since the radio network is shared by all applications (e.g., email, web browsing, etc.), an MTU is selected that helps the other applications. Large MTUs have the potential for increasing the effective radio network bandwidth by decreasing the overhead per data octet. Large MTUs are also beneficial for the applications that run over TCPt.

II) Enhanced Charging Service

As mobile operators deploy next generation networks, they will have the opportunity to enhance their service offerings and their billing capabilities. The inline wireless network access device describe herein furthers this ability by providing enhanced "subscriber understanding" through in-depth examination of data packets during normal processing. One advantage this enhanced analysis provides to a mobile operator is tiered billing schemes for data users, based on how they utilize their mobile device. This, in turn, opens up numerous additional revenue generating opportunities by allowing subscribers to select the specific services they wish to use, while giving the wireless operator the ability to charge subscribers at various levels, based on how they use the network. The described embodiment provides hardware and software capable of supporting the increased processing needed to support such analysis.

The cdma2000 IP Network Standard (TIA/EIA/IS-835) defines the specific contents of usage-based data records that are sent from a PDSN to a RADIUS server. IS-835 outlines a subset of information that can be used for event-based billing applications. In addition to standards-defined billing requirements, the described embodiment supports other advanced billing options such as:

Destination-based billing.

Reverse destination-based billing.

Application-based billing.

Other charging options such as QoS, time-of-day, peak-load, among others.

For destination-based billing option, the described embodiment maintains a set of statistics for a set of destination servers for each mobile subscriber. Destination servers can either be explicitly configured by the network administrator or supplied by the RADIUS server from the subscriber's profile. Destination-based billing allows more revenue generating options with creation of premium sites. Also, operators will be much more informed about the habits of their subscribers (what, when and how much they access different hosts), becoming a great tool for network and service planning.

Reverse destination-based billing allows the mobile operator to generate revenues by billing advertisers, portals or content providers when transactions from the mobile subscriber hit those sites. This provides the wireless subscriber with low-cost to no-cost access, while offering a new revenue stream for the mobile operator and content providers. For reverse destination-based billing, the described embodiment counts statistics from specific destination servers and excludes those statistics from the total mobile session statistics.

For application-based billing, the described embodiment maintains statistics for a specified application, or group of applications, for a set of destination servers for all, or any subset, of mobile subscribers. One technique for enabling this feature is to utilize simple access control lists (ACLs) to identify and track all traffic data to and from mobile subscribers. Using ACLs, the described embodiment identifies traffic at very granular levels so as to identify stateless applications such as SMTP, Telnet and others. This technique, however, does not support stateful applications such as FTP, HTTP, SIP and H.323. Therefore a more complete solution requires stateful inspection services applied to all mobile subscriber traffic. With this technique, the described embodiment identifies both stateless and stateful applications, allowing the wireless operator to apply different charging rates based on the application used. In some embodiments, additional operation modes are provided to maintain statistics for different sets of applications for any number of destination servers.

With the deep packet inspection capabilities of the described embodiment, many other models for enhanced billing models may be implemented. For example, QoS-based billing allows charging based on quality of service level of the subscriber's packets. Time-of-day-based billing includes in the accounting data information about when the subscriber data was transmitted. Peak-load or volume-based billing incorporates accounting criteria for burst and steady usage. Other embodiments combine some or all of these billing models together to allow operators great flexibility in pricing plans for wireless data service offerings.

Traffic to and from wireless subscribers pass through multiple software tasks executing within the CP subsystems 202 of the Packet Accelerator Cards 200, and is distributed throughout the inline wireless network access device. Each task handles a limited number of subscribers, most importantly to provide fault containment. For this reason, in the described embodiment the task implements the stateful packet inspection for application-based billing as such inspection must collect both receive and transmit statistics.

In an embodiment supporting multiple PACs, the inline wireless network access device incorporates multiple high-performance CPUs and memory, all dedicated to processing wireless subscriber control and data. The types of control and subscriber data that are processed include PPP processing, Simple and Mobile IP services, mobile subscriber authentication and accounting, and obtaining subscriber statistics, while the Packet Forwarding subsystems perform all packet forwarding functions.

FIG. 7 shows, for the described embodiment, an example of the type of information that can be collected and presented to the carriers for application-based billing. In this example, application-based billing data has been collected for a specific subscriber across three different destination servers.

In addition to capturing per subscriber, per destination, and per application statistics, other embodiments present statistics for groups of subscribers, such as all subscribers with the same domain name (e.g., *@starentnetworks.com).

Once the usage data is collected, it can be accessed and reported in a variety of ways. The counters representing the usage data for each subscriber can be polled real-time via the command line interface (CLI), presented to the graphical user interface (GUI) through the element management system, or accessed by a third party management application via CORBA of SNMP. Logs or billing records can be generated in the form of syslog events or RADIUS accounting attributes within accounting messages.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. An apparatus for providing network access and application session services, comprising:
a wireless network access device for receiving packet data streams from or transmitting packet data streams to one or more subscribers, and for conveying the packet data streams to or from a network or other subscribers, wherein the wireless network access device includes profile information relating to the one or more subscribers;
a plurality of application session services being a component of the wireless network access device, wherein each application session service comprises an application state regarding the state of the respective service;
wherein the wireless network access device selects, based on the profile information, two or more of the application session services to process the packet data streams, and wherein the wireless network access device determines a preferred order for executing the selected application session services, and arranges the selected application session services to execute in the preferred order, and wherein the wireless network access device controls the actions of at least one of the application session services based at least in part on the application state of a different one of the application session services.

2. The apparatus of claim 1, wherein the preferred order is configured or determined according to how at least one of the application session services affects at least one of the other application session services.

3. The apparatus of claim 1, wherein for each of the subscribers, the wireless network access device determines based on the subscriber profile information, which application session services should not be executed for packet data streams to or from the subscriber, and excludes from execution those of the one or more application session services that should not be executed for packet data streams to or from the subscriber.

4. The apparatus of claim 1, wherein at least one of the application session services includes a charging service that examines content of the packet data stream, determines an amount to be charged for the content, and maintains a record of the amounts charged.

5. The apparatus of claim 1, wherein the application session services include at least one of parental controls, malicious code detection, stateful firewall, intrusion detection, intrusion prevention, virus checking and VPN services.

6. The apparatus of claim 1, wherein the application session services include at least three of parental controls, malicious code detection, stateful firewall, intrusion detection, intrusion prevention, virus checking and VPN services.

7. The apparatus of claim 1, wherein an application session service maintains application state across multiple packets of the same packet stream.

8. An apparatus for providing network access and application session services, comprising:
a wireless network access device for receiving packet data streams from or transmitting packet data streams to one or more subscribers, and for conveying the packet data streams to or from a network or other subscribers, wherein the wireless network access device includes profile information relating to the one or more subscribers;

a plurality of application session services being a component of the wireless network access device, wherein each application session service comprises an application state regarding the state of the respective service;

wherein the wireless network access device selects, based on the profile information, two or more of the application session services to process the packet data streams, and wherein the wireless network access device controls the actions of at least one of the application session services based at least in part on the application state of a different one of the application session services, and wherein the wireless network access device and the application session services are implemented with redundancy.

9. The apparatus of claim 8, wherein an application session service maintains application state across multiple packets of the same packet stream.

10. A method of providing network access and application data session services, comprising:

receiving packet data streams from or transmitting packet data streams to one or more subscribers with a wireless network access device, and conveying the packet data streams to or from a network or other subscribers, wherein the wireless network access device includes profile information relating to the one or more subscribers;

providing a plurality of application session services as a component of the wireless network access device, wherein each application session service comprises an application state regarding the state of the respective service;

selecting, based on the profile information, two or more of the application session services to process the packet data streams;

determining a preferred order for executing the selected application session services, and arranging the selected application session services to execute in the preferred order; and controlling the actions of at least one of the application session services based at least in part on the application state of a different one of the application session services.

11. The method of claim 10, further comprising for each of the subscribers, determining which application session services should not be executed for packet data streams to or from the subscriber, the determining being based on the subscriber profile information, and excluding from execution those of the one or more application session services that should not be executed for packet data streams to or from the subscriber.

12. The method of claim 10, further comprising examining content of the packet data stream, determining an amount to be charged for the content, and maintaining a record of the amounts charged.

13. The method of claim 10 wherein the application session services include at least one of parental controls, malicious code detection, stateful firewall, intrusion detection, intrusion prevention, virus checking and VPN services.

14. The method of claim 10 wherein the application session services include at least three of parental controls, malicious code detection, stateful firewall, intrusion detection, intrusion prevention, virus checking and VPN services.

15. The method of claim 10, further comprising maintaining the application state of an application session service across multiple packets of the same packet stream.

16. An apparatus for providing network access and application session services, comprising:

a wireless network access device for receiving packet data streams from or transmitting packet data streams to one or more subscribers, and for conveying the packet data streams to or from a network or other subscribers;

a plurality of application session services being a component of the wireless network access device, wherein the one or more application session services processes the packet data streams;

wherein the wireless network access device selects two or more of the application session services from the plurality of application session services to process the packet data streams; and, wherein the wireless network access device determines an application state regarding the state of a first application service, and modifies actions of a second application session services based on the application state of the first application service.

17. The apparatus of claim 16, wherein the wireless network access device performs deep packet inspection to determine the application state associated with the packet data streams.

18. The apparatus of claim 16, wherein the wireless network access device modifies actions associated with an application session service concerned with billing functions when another application session service modifies or drops packets from the packet data stream.

19. The apparatus of claim 16, wherein the application session services include at least one of parental controls, malicious code detection, stateful firewall, intrusion detection, intrusion prevention, virus checking and VPN services.

20. The apparatus of claim 16, wherein at least in some instances, the wireless network access device selects zero application session services from the plurality of application session services to process the packet data streams.

21. The apparatus of claim 16, wherein at least in some instances, the wireless network access device selects one application session service from the plurality of application session services to process the packet data streams.

22. The apparatus of claim 16, wherein at least in some instances, the wireless network access device selects more than one application session service from the plurality of application session services to process the packet data streams.

23. The apparatus of claim 16, wherein the application session services include at least three of parental controls, malicious code detection, stateful firewall, intrusion detection, intrusion prevention, virus checking and VPN services.

24. The apparatus of claim 16, wherein an application session service maintains the application state regarding the state of the first application service across multiple packets of the same packet stream.

25. A method of providing network access and application session services, comprising:

receiving packet data streams from or transmitting packet data streams to one or more subscribers with a network access device, and conveying the packet data streams to or from a network or other subscribers, wherein one or more application session services are a component of the wireless network access device;

providing a plurality of application session services as a component of the wireless network access device, wherein the one or more application session services processes the packet data streams;

selecting two or more of the application session services from the plurality of application session services to process the packet data streams;

determining an application state regarding the state of a first application service; and modifying actions of a second application session service based on the application state of the first application service.

26. The method of claim 25, further comprising performing deep packet inspection to determine the application state associated with the packet data streams.

27. The method of claim 25, further comprising modifying actions associated with an application session service concerned with billing functions when another application session service modifies or drops packets from the packet data stream.

28. The method of claim 25 wherein the application session services include at least one of parental controls, malicious code detection, stateful firewall, intrusion detection, intrusion prevention, virus checking and VPN services.

29. The method of claim 25, wherein at least in some instances, zero application session services are selected from the plurality of application session services to process the packet data streams.

30. The method of claim 25, wherein at least in some instances, more than one application session services are selected from the plurality of application session services to process the packet data streams.

31. The method of claim 25 wherein the application session services include at least three of parental controls, malicious code detection, stateful firewall, intrusion detection, intrusion prevention, virus checking and VPN services.

32. The method of claim 25, further comprising maintaining the application state regarding the state of the first application service across multiple packets of the same packet stream.

33. A method of providing network access and application data session services, comprising:

receiving packet data streams from or transmitting packet data streams to one or more subscribers with a wireless network access device, and conveying the packet data streams to or from a network or other subscribers, wherein the wireless network access device includes profile information relating to the one or more subscribers;

providing a plurality of application session services as a component of the wireless network access device, wherein each application session service comprises an application state regarding the state of the respective service;

selecting, based on the profile information, two or more of the plurality of application session services to process the packet data streams; determining a preferred order for executing the selected application session services;

arranging the selected application session services to execute in the preferred order;

determining an application state regarding the state of a first application service; and modifying the actions of a second application session service based on the application state of the first application service.

34. The method of claim 33, wherein at least in some instances, zero application session services are selected from the plurality of application session services to process the packet data streams.

35. The method of claim 33, wherein at least in some instances, more than one application session services are selected from the plurality of application session services to process the packet data streams.

36. The method of claim 33, further comprising maintaining the application state regarding the state of the first application service across multiple packets of the same packet stream.

* * * * *

UNITED STATES PATENT AND TRADEMARK OFFICE
CERTIFICATE OF CORRECTION

PATENT NO. : 7,813,759 B2
APPLICATION NO. : 11/649328
DATED : October 12, 2010
INVENTOR(S) : Kenneth E. Virgile It is certified that error appears in the above-identified patent and that said Letters Patent is hereby corrected as shown below:

Column 14: Please correct Claim 16 to read:

16. An apparatus for providing network access and application session services, comprising:

a wireless network access device for receiving packet data streams from or transmitting packet data streams to one or more subscribers, and for conveying the packet data streams to or from a network or other subscribers;

a plurality of application session services being a component of the wireless network access device, wherein the one or more application session services processes the packet data streams;

wherein the wireless network access device selects two or more of the application session services from the plurality of application session services to process the packet data streams; and, wherein the wireless network access device determines an application state regarding the state of a first application service, and modifies actions of a second application session ~~services~~ service based on the application state of the first application service.

Signed and Sealed this
Twenty-sixth Day of June, 2012

David J. Kappos
*Director of the United States Patent and Trademark Office*

UNITED STATES PATENT AND TRADEMARK OFFICE
CERTIFICATE OF CORRECTION

PATENT NO. : 7,813,759 B2
APPLICATION NO. : 11/649328
DATED : October 12, 2010
INVENTOR(S) : Kenneth E. Virgile Page 1 of 1

It is certified that error appears in the above-identified patent and that said Letters Patent is hereby corrected as shown below:

Column 14, lines 4-22, Please correct Claim 16 to read:

16. An apparatus for providing network access and application session services, comprising:

a wireless network access device for receiving packet data streams from or transmitting packet data streams to one or more subscribers, and for conveying the packet data streams to or from a network or other subscribers;

a plurality of application session services being a component of the wireless network access device, wherein the one or more application session services processes the packet data streams;

wherein the wireless network access device selects two or more of the application session services from the plurality of application session services to process the packet data streams; and, wherein the wireless network access device determines an application state regarding the state of a first application service, and modifies actions of a second application session ~~services~~ service based on the application state of the first application service.

This certificate supersedes the Certificate of Correction issued June 26, 2012.

Signed and Sealed this
Thirty-first Day of July, 2012

David J. Kappos
*Director of the United States Patent and Trademark Office*